United States Patent Office 2,772,198
Patented Nov. 27, 1956

2,772,198

METHOD OF KILLING FLIES WITH COMPOSITION COMPRISING PYRETHRINS AND p-AMINOAZOBENZENE

Carl W. Smith, Evanston, Ill., and Norman W. Templin, Hammond, Ind., assignors to Standard Oil Company, Chicago, Ill., a corporation of Indiana No Drawing. Application November 8, 1954,
Serial No. 467,624

2 Claims. (Cl. 167—24)

This invention relates to a stabilized pyrethrum insecticide and it pertains more particularly to an improved insecticidal composition useful for killing flies and other insects.

The pyrethrins (pyrethrum) for use in insect sprays are commonly marketed with a synergist such as piperonyl butoxide, usually about 1 to 2 parts by weight of pyrethrins to 10 parts of piperonyl butoxide. When pyrethrins themselves or such pyrethrin concentrates are formulated into insecticidal compositions, there is a tendency for the pyrethrins to lose their effectiveness. This loss of effectiveness appears to be due to pyrethrin decomposition caused in part by oxidation, but chiefly by polymerization or other degradation process promoted by ultra-violet light. The object of this invention is to provide a pyrethrin insecticide composition which is more stable than compositions heretofore known to the art, particularly when exposed to ultra-violet light. A further object is to provide an effective insect spray for killing houseflies and insects which attack growing plants, such as Cabbage Loopers which attack Brussels sprouts.

We have found that when an amino azobenzene, such as p-amino azobenzene, is added to a pyrethrin-containing insecticide in amounts in the range of about .1 to 5 times the concentration of the pyrethrins, the toxic period of the pyrethrins may be extended by a factor of 4 to 6 times. Although the amino azobenzene per se is not appreciably toxic to flies, its use with the pyrethrin composition greatly increases the effectiveness thereof, particularly when stored or applied in the presence of ultra-violet light. The amino azobenzene apparently functions both as a light filter and as an antioxidant although the precise mechanism of its functioning has not been determined with certainty.

An example of an improved plant spray composition is as follows:

|  | Weight percent |
|---|---|
| Pyrocide 175 | .25 |
| (Pyrethrins) | (.05) |
| Piperonyl butoxide | .25 |
| P-amino azobenzene | .25 |
| Ethanol | 9.75 |
| Mineral seal oil | 14.50 |
| Freon-11 (trichloromonofluoromethane) | 37.50 |
| Freon-12 (dichlorodifluoromethane) | 37.50 |

The Freon components were employed as the propellant, this formulation being of the aerosol type for application by small home gardeners. When the above composition was applied in a spray type dispenser to growing Brussels sprout plants (about 1 gram per plant) which were subject to attack by imported cabbage worms and Cabbage Loopers and other Brussels sprout plants were sprayed with a similar formulation with 10 per cent ethanol and no amino azobenzene, the azobenzene-containing composition gave significantly better protection against insect injury to the Brussels sprouts than was afforded by the pyrethrin spray alone.

The effectiveness of the amino azobenzene stabilizer is most strikingly shown by accelerated ageing tests in the presence of ultra-violet light. The following table shows results obtained when the listed formulations were coated on the inside of glass dishes and were then exposed to ultra-violet light for the indicated length of time. The effectiveness on houseflies of formulations aged in this manner was then determined under comparable conditions.

*Pyrethrin stability tests*

| Formulation Number | 1 | 2 | 3 |
|---|---|---|---|
| Active Ingredients, mg.: |  |  |  |
| Pyrethrins | 10 | 10 | 10 |
| P-Amino Phenol |  | 5 |  |
| P-Amino Axobenzene |  |  | 5 |
| Results of Residue Tests on Houseflies; Percent Kill (Average of 5 Tests) after Ultra-Violet Exposure of: |  |  |  |
| 1 Day | 70 | 98 | 100 |
| 2 Days | 40 | 95 | 100 |
| 4 Days | 0 | 45 | 90 |
| 6 days | 0 | 5 | 65 |

These tests show how the effectiveness of pyrethrins per se is impaired by exposure to ultra-violet light and they show the remarkable effectiveness of amino azobenzene in stablizing the pyrethrins against such loss of effectiveness. While p-amino phenol is a fairly good stabilizer, it is not nearly as effective as the amino azobenzene.

To demonstrate that the same results are obtained when the pyrethrins are employed together with a synergist and diluent of the type commonly employed in insecticidal composition, another series of tests was made by coating the listed formulations on the inside of glass dishes, exposing to ultra-violet light for the indicated length of time and determining effectiveness of the formulations aged in this manner for killing houseflies.

*Pyrethrin stability tests*

| Formulation Number | 1 | 2 | 3 | 4 |
|---|---|---|---|---|
| Active Ingredients, Percent by Weight: |  |  |  |  |
| Pyrethrins | 1.0 | 1.0 | 1.0 | 1.0 |
| Piperonyl Butoxide | 10.0 | 10.0 | 10.0 | 10.0 |
| Phenyl Salicylate |  | 2.0 |  |  |
| P-Amino Phenol |  |  | 0.5 |  |
| P-Amino Azobenzene |  |  |  | 0.5 |
| Results of Residue Tests on Houseflies; Percent Kill (Average of 5 Tests) after Ultra-Violet Exposure of: |  |  |  |  |
| 0.5 Hour | 25 | 43 | 64 | 73 |
| 1.0 Hour | 5 | 53 | 57 | 84 |
| 1.5 Hours | 3 | 30 | 63 | 85 |
| 2.0 Hours | 0 | 30 | 63 | 88 |

Thus it is demonstrated that exposure to ultra-violet light rapidly destroys the effectiveness of the pyrethrins as insecticides, particularly with respect to houseflies. P-amino phenol and phenyl salicylate have some stabilizing effect but p-amino azobenzene is outstanding and vastly superior in stabilizing the effectiveness of the pyrethrins when exposed to ultra-violet light.

In another series of pyrethrin stability tests, various amounts of p-amino azobenzene were employed in pyrethrin insecticides and the stabilizing effect was determined by dipping filter paper in the respective formulations, drying the filter paper and testing the residue on the paper for effectiveness against houseflies initially and, after exposure to ultra-violet light, for the indicated time intervals.

*Pyrethrin stability tests*

| Formulation Number | 1 | 2 | 3 | 4 | 5 | 6 |
|---|---|---|---|---|---|---|
| Ingredients, Percent by Weight: | | | | | | |
| Pyrethrins | 2.0 | 2.0 | 2.0 | 2.0 | 2.0 | 2.0 |
| Piperonyl Butoxide | 10.0 | 10.0 | 10.0 | 10.0 | 10.0 | 10.0 |
| P-Amino Azobenzene | | 0.1 | 0.2 | 0.3 | 0.4 | 0.5 |
| Ethyl Alcohol | 88.0 | 87.9 | 87.8 | 87.7 | 87.6 | 87.5 |
| Results of Tests on Houseflies; Percent Kill (Average of 3 Tests) after Ultra-Violet Exposure of: | | | | | | |
| 0 Hours | 73 | 65 | 72 | 78 | 68 | 63 |
| 4 Hours | 0 | 2 | 22 | 23 | 62 | 57 |
| 8 Hours | | 0 | 10 | 9 | 15 | 33 |

The above data indicate that the amount of p-amino azobenzene should be at least about .1 the amount of pyrethrins in the composition and that its effectiveness increases with amount of added p-amino azobenzene. Amounts approximately equal to or even five times the amount of pyrethrins by weight are usually preferred.

It should be understood that the stabilized pyrethrins may be employed per se as insecticides or they may be employed in any suitable diluent or carrier known to the art. Preferably, the stabilized pyrethrin is employed in a refined mineral oil boiling in the range of about 350 to 700° F. such as kerosene, mineral seal, and non phytocidal white oils, the concentration of the pyrethrins in the total spray usually being in the range of about .02 to 2 percent. Other insecticidal components may be present and as indicated in the example, an aerosol propellant may be included in the mixture when it is applied by pressurized spray technique.

The stabilized pyrethrins are of course effective against the same insects with the same types of formulations as heretofore employed with pyrethrin-containing insecticide; however, the presence of the amino azobenzene makes it possible to employ lesser amounts of pyrethrins than would otherwise be required and/or the reduction and, in some cases, the elimination of the synergist and/or other insecticide such as D. D. T., Chlorodane, etc. commonly employed in pyrethrin-containing insecticide compositions. While the invention is particularly effective with natural pyrethrins, advantageous results may also be obtained with mixtures of natural and synthetic pyrethrins or even with the synthetic compositions per se.

We claim:

1. The method of killing flies which comprises spraying a fly-infested area with a composition comprising a refined mineral oil containing about .02 to 2 weight per cent of pyrethrins based on total composition which composition contains an amount by weight of p-amino azobenzene which is .2 to 5 times the amount of pyrethrins.

2. The method of killing flies which comprises spraying a fly-infested area with a composition comprising a refined mineral oil, ethanol, pyrethrins in an amount in the range of .02 to 2 weight per cent, an amount of piperonyl butoxide sufficient to synergize the pyrethrins and an amount of p-amino azobenzene to give a weight ratio of p-amino azobenzene to pyrethrins in the range of .1:1 to 5:1.

References Cited in the file of this patent

UNITED STATES PATENTS

| 1,942,827 | Mills | Jan. 9, 1934 |
| 2,011,428 | Voorhees | Aug. 13, 1935 |
| 2,300,612 | Christmann | Nov. 3, 1942 |
| 2,538,724 | Hass | Jan. 16, 1951 |

OTHER REFERENCES

Stahl: Journal of Economic Entomology, October 1946, pp. 610–612.

Chem. Abstracts, 1953, 829f.

Gersdorff: Journal of Economic Entomology, June 1952, pp. 519–523.